Figure 1:
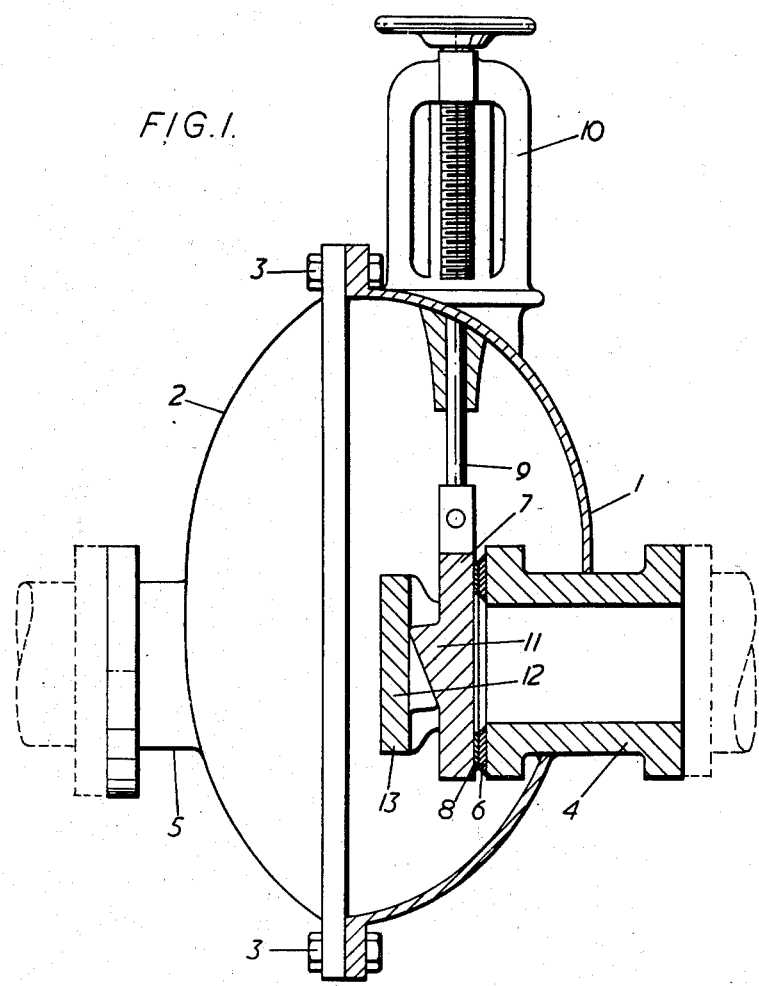

Aug. 2, 1960 W. McINNES 2,947,511
VALVES
Filed Feb. 8, 1957 4 Sheets-Sheet 4

Inventor
WILLIAM McINNES
By
Mead, Browne, Schuyler + Burridge
Attorneys

# United States Patent Office 2,947,511
Patented Aug. 2, 1960

2,947,511
VALVES

William McInnes, Stockton-on-Tees, England, assignor to The Power-Gas Corporation Limited, Durham, England, a British company Filed Feb. 8, 1957, Ser. No. 639,095

Claims priority, application Great Britain Feb. 10, 1956

5 Claims. (Cl. 251—203)

The present invention relates to valves for controlling and regulating the flow of fluids and is especially applicable to large size stop valves for use with fluids at temperatures and/or pressures other than atmospheric.

In general a valve consists of a valve body or casing having an inlet connection and an outlet connection, a valve seat which is keyed to a part of the valve body or casing and a valve closure member which can be moved to cover the valve seat to a varying extent by means of a suitable mechanism. In the case of stop valves means are also provided for causing the valve closure member to thrust against the valve seat, when in the closed position, to obtain a tight joint, the valve seat and valve closure member being usually machined or ground to provide such a joint.

In a conventional design of valve the valve body is constructed of cast or forged metal in one piece. In another known design of a large size valve, the valve casing is constructed of fabricated metal plate and the walls of the casing connected with the inlet and outlet connections, respectively, are substantially flat.

When valves of known design are subjected to varying temperatures and/or pressures it has been found that due to stresses set up in the valve body or casing the valve seat becomes distorted relative to the valve closure member, resulting in clearances between the valve seat and valve closure member and consequent leakage when the valve is in the closed position, and a hindrance to regulating the flow of fluid by partially closing the valve.

An object of the present invention is to provide a valve in which distortion of the valve seat relative to the valve closure member is substantially reduced when the valve is subjected to varying temperatures and/or pressures.

This is advantageous in the case of a stop valve as it can enable the sealing-off tightness of the valve when it is in the closed position to be better maintained and the regulation of the flow of fluid by partially closing the valve to be less hindered.

According to the present invention, a valve comprises two bowl-shaped members of fabricated metal plate detachably fastened together to form a valve casing, said members having respectively an inlet and outlet connection member with at least one of the connection members protruding into the valve casing, a valve seat carried by or forming part of one of or that one of said connection members which protrudes into the valve casing, and a valve closure member movable relatively to the valve seat to cover the valve seat to a varying extent.

The bowl-shaped members of fabricated metal plate form a stress relieving valve casing in which any stresses set up, such as by a fluid when the valve is in use, are substantially uniformly distributed. The more uniform the stress distribution in the valve casing the less is the liability for distortion to arise. This is advantageous in a stop valve, particularly between the valve seat and the valve closure member as the risk of leakage when the valve is closed and hindrance to the regulation of the flow of fluid by partially closing the valve are thereby reduced.

The bowl-shaped members of fabricated metal plate may be shaped as, or approximately as, a segment of a sphere, or of an ellipsoid or of a paraboloid, or are shaped as or approximately as a segment of a sphere or of an ellipsoid or of a paraboloid in combination with a cylindrical piece.

The perimeter of each bowl-shaped member may be flanged, or a flange may be welded on, and the two complementary bowl-shaped members detachably fastened together by means of bolts through bolt holes in the flanges and tightening nuts.

Each inlet and outlet connection members may comprise a seamless metal tube or a tube or duct of fabricated metal plate or cast metal. In a preferred form of construction both the inlet and outlet connection members protrude into the valve casing. Alternatively only one of the connection members may protrude into the valve casing whilst the other is welded to one of the bowl-shaped members and is terminated substantially in the region of its junction with the dished member.

The valve seat may comprise a machined ring or segment secured to, projecting from, or forming part of an inlet or outlet connection member which protrudes into the valve casing. The valve seat may be in a plane at right angles or inclined at some other angle, to the axis of said connection member.

When the valve is to function as a stop valve the valve closure member is caused to thrust against the valve seat, at least in the closed position, either by means of the operating mechanism which is provided for moving the valve stem or by means of an additional device such as at least one wedge shaped projection provided on the valve closure member for engaging a complementary wedge piece rigidly attached to a connection member or to the valve casing.

In one embodiment of the invention a valve includes a valve seat carried by or forming part of one of said connection members, a valve disc slidably displaceable relative to the valve seat and means for causing the valve disc to slide substantially parallel to the valve seat and to thrust thereagainst at least when in the closed position.

The valve closure member may be constructed of fabricated metal plate, or of cast or forged metal, and have a substantially flat or convex surface facing the valve seat and of sufficient area to fully cover the connection member or at least the valve seat. A machined ring or segment is secured to or forms part of the valve closure member for engaging the valve seat.

A valve stem may be attached to the valve closure member, which stem passes through a stuffing box attached to the valve casing and any known operating mechanism may be provided for moving the valve stem to and fro thus moving the valve closure member relative to the valve seat. Examples of operating mechanisms are a screw and handle on the valve stem, a piston attached to the valve stem located in a cylinder to which pressure fluid is passed, and an electromagnetic solenoid.

In another embodiment of the present invention the valve closure member has a part spherical shape and thus according to another feature of the invention, a valve comprises a valve casing, an inlet connection member and outlet connection member, one of said connection members extending within the casing and terminating therein with a valve seat, a valve closure member shaped as a segment of a solid or hollow sphere and connected to a valve stem extending through the casing for moving the valve closure member along a line inclined at an angle other than a right angle, for example 45°, to the axis of the connecting member terminating with said valve seat, said valve seat lying in a plane inclined to the axis of said connection member and having a part spherical valve seating surface complementary to the valve closure member.

The present invention is of particular advantage where large size valves are required for use with fluids at temperatures substantially above or below atmospheric and/or at substantially superatmospheric pressure and under vacuum. For a given size of valve embodying the present invention the limits of temperatures and pressures to which it is applicable are dependent on the metal plate from which the dished members are fabricated. As one example of the temperature and pressure envisaged, a 4'6" bore valve with the bowl-shaped members of fabricated mild steel plate has been designed for use with carbon dioxide gas at a temperature of 700° F. and at a pressure of 125 pounds per square inch gauge. The invention is in no way dependent on the size of valve or temperature or pressure at which the valve is used.

The metal plate of which the bowl-shaped members are fabricated is chosen with regard to the fluid it is intended should be controlled by the valve so that it will be resistant thereto under envisaged operation conditions of temperature and pressure. The metal plate may consist of a composite plate comprising a relatively thin plate of comparatively expensive resistant metal adhering to a thicker plate of base metal, such as, for example, nickel-clad mild steel and stainless steel-clad mild steel.

Figure 2:
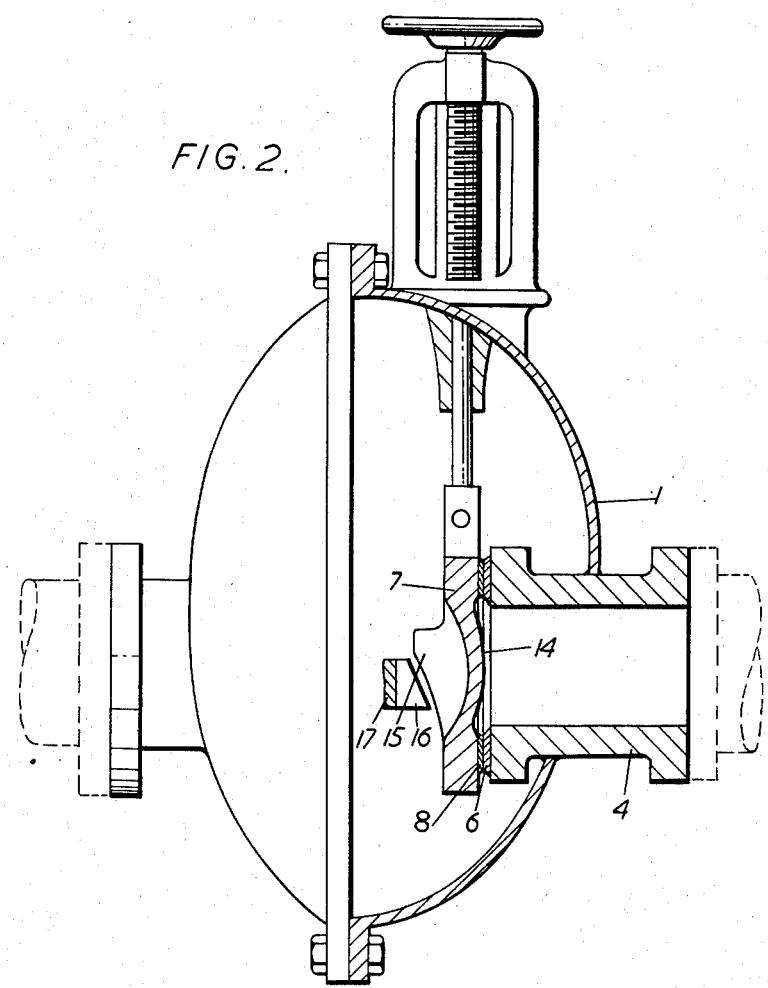
Figure 3:
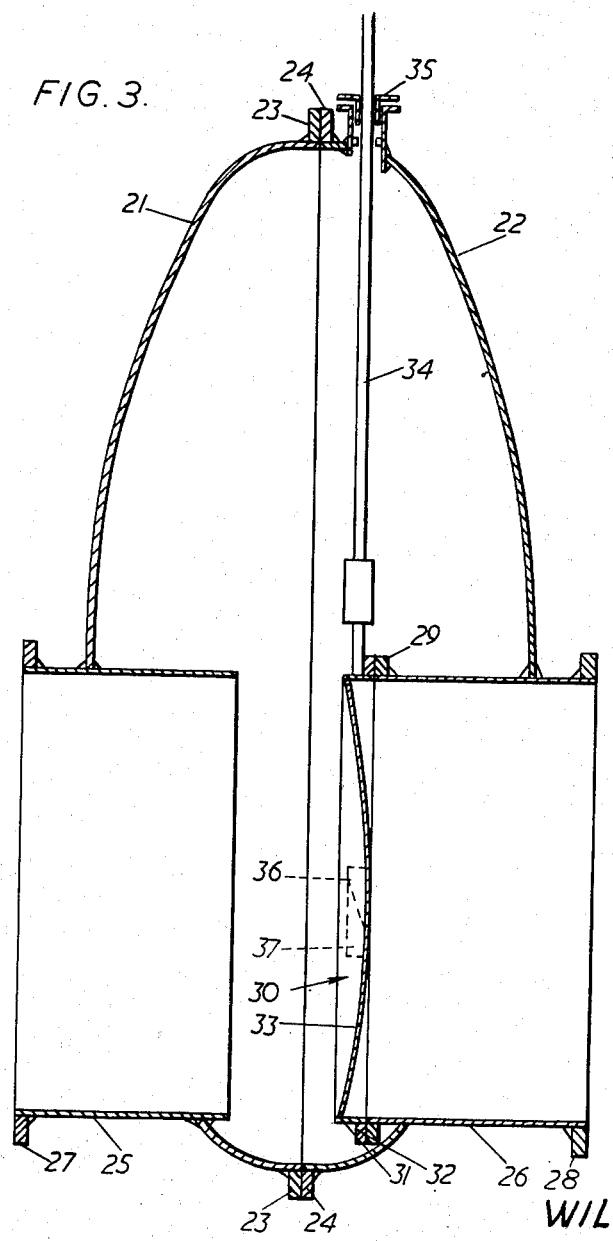
Figure 4:
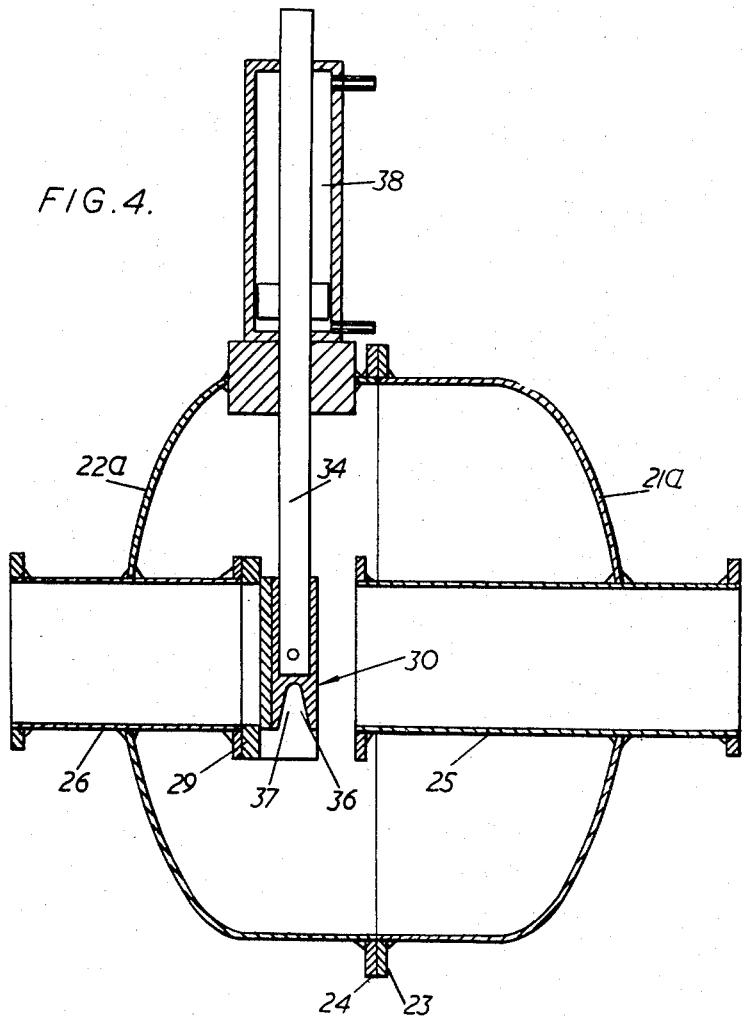

The invention will be further described by way of example with reference to the accompanying drawings in which:

Fig. 1 is a diagrammatic part sectional elevation of one embodiment of the invention, Fig. 2 is a diagrammatic part sectional elevation of another embodiment of the invention, Fig. 3 is a diagrammatic sectional elevation of a gate valve embodying the present invention and suitable for manual operation, and Fig. 4 is a diagrammatic sectional elevation of a gate valve embodying the present invention and for pressure fluid operation.

In the embodiment illustrated in Fig. 1 a stop valve comprises two torrispherical or bowl shaped members 1, 2 detachably connected together such as by bolts 3, to form a valve casing. The members 1, 2 carry an outlet connection member 4 and an inlet connection member 5 respectively, the members 4 and 5 being substantially in axial alignment and extending through the members 1 and 2 which are secured thereto, such as by welding. A valve seat 6 in the form of a machined ring is secured, such as by welding, to a flange at the inner end of the outlet connection member 4. A valve disc indicated generally at 7 carries a machined ring 8 on its surface facing the connection member 4 and is connected to a valve stem 9 which passes through a stuffing box, not shown, and connects with a suitable operating mechanism such as a screw and handwheel as indicated generally at 10 which is carried by the member 1.

The valve disc 7 is provided with a wedge shaped projection 11 extending from its other surface for engagement with a corresponding wedge piece 12 extending from a bridge member 13 secured to the connection member 4. In Fig. 1 the valve disc 7 is illustrated in a closing position in which the wedge portions 11 and 12 are in engagement with one another so as to thrust the valve disc towards the connection member 4 and promote a tight joint between the valve seat 6 and the ring 8. By operation of the mechanism 10 the valve disc is caused to slide substantially parallel to the valve seat to open the valve.

The torrispherical or bowl-shaped members 1, 2 are of fabricated construction from a material such as metal plate which is sufficiently elastic that the two members 1 and 2 form a valve casing in which any stresses set up are substantially uniformly distributed.

In the embodiment illustrated in Fig. 1 the valve disc 7 has a substantially flat surface facing the connection member 4 and an alternative construction is illustrated in Fig. 2 in which the valve disc 7 has a torrispherical or dished portion 14 having a convex surface facing the connection member 4, the valve disc carrying a ring 8 for engaging the valve seat 6. Whereas in the embodiment illustrated in Fig. 1 the valve disc 7 has a single wedge shaped projection 11, the valve disc 7 in the embodiment illustrated in Fig. 2 is provided with two wedge shaped projections diametrically opposed to one another and of which only one 15 is shown in Fig. 2. Each of these projections 15 are engageable with a corresponding wedge shaped member 16 extending from a bar 17 extending transversely of the valve casing and being rigidly secured to the dished member 1.

In the embodiment illustrated in Fig. 3 a valve comprises two fabricated bowl-shaped members 21, 22 detachably connected together to form a valve casing. The members 21, 22 are fabricated from sheet material and include flange rings 23, 24 welded thereto respectively. The flange rings are drilled to provide bolt holes to receive bolts and nuts, not shown, for connecting the members 21 and 22 together. The member 21 carries a connection member 25 and the member 22 carries a connection member 26, the members 25 and 26 being substantially in axial alignment. In this valve the connection members 25 and 26 serve as inlet and outlet connection members respectively. The connection members 25 and 26 may be constructed of seamless metal tubes or may be fabricated from metal plate and have at their outer ends connection flanges 27, 28 respectively. At least the outlet connection member 26 protrudes into the inside of the casing formed by the members 21 and 22. In the embodiment illustrated in Fig. 3 the inlet connection member 25 also protrudes into the casing though this is not essential and the inlet connection member may be terminated in the region where it joins the bowl-shaped member 21. The connection members are secured to the dished members by welding.

A valve seat 29 in the form of a machined ring is secured, such as by welding, to the inner protruding end of the outlet connection member 26. A valve disc indicated generally at 30 comprises a ring 31 to which is welded a machined flange 32 for engaging the valve seat 29, and a member 33 in the form of a segment of a hollow sphere having a convex surface facing the outlet connection member 26. The valve disc 30 is connected to a valve stem 34 which passes through a stuffing box 35 and connects with a suitable operating mechanism, not shown, such as a screw and handwheel. The valve disc is provided with two diametrically opposed wedge shaped projections such as 36 for engagement with corresponding wedges such as 37 carried by the connection member 26.

The valve disc 30 is illustrated in Fig. 3 in a closing or closed position in which the wedge portions 36 and 37 are in engagement with one another so as to thrust the valve disc 30 towards the outlet connection member 26 and so promote a tight joint between the valve seat 29 and the flange 32.

The bowl-shaped members 21 and 22 in the valve illustrated in Fig. 3 are each shaped approximately as a segment of an ellipsoid. Any stresses set up in the casing such as by fluid when the valve is in use are substantially uniformly distributed thereby reducing the liability for distortion to arise between the valve seat 29 and the valve disc 30.

The valve shown in Fig. 4 is similar to the valve shown in Fig. 3, a parallel slide gate valve but is adapted for operation by a pressure fluid. In the valve of Fig. 4, two bowl-shaped members 21a and 22a are detachably connected together to form the valve casing and carry respectively the connection members 25 and 26 which in this valve serve as outlet and inlet connection members respectively. The inlet connection member 26 carries the valve seat 29 and the valve disc 30 is provided with a wedge shaped projection 36 for engagement with a corresponding wedge shaped member 37 connected to the inlet connection member 26. The valve stem 34 to which the valve disc 30 is connected terminates in a pressure fluid operated piston and cylinder mechanism 38 for effecting movement of the valve disc.

The bowl-shaped members 21a and 22a of the valve of Fig. 4 are each fabricated from sheet metal and are each shaped approximately as a segment of an ellipsoid combined with a cylindrical piece.

The bowl-shaped members 1, 2; 21, 22; and 21a and 22a; in each of the valves illustrated in the accompanying drawings are detachably secured together by bolts passing through bolt holes in flanges 3 and 4 or 23 and 24. Each of the bowl-shaped members may be made of fabricated metal plate and may be shaped as or approximately as a segment of a sphere, ellipsoid or paraboloid or as such a segment combined with the cylindrical piece. Two similarly shaped dished members when connected together to form a valve casing effectively constitute a stress relieving valve casing in which any stresses set up such as by fluid when the valve is in use are substantially uniformly distributed, and in practice the more uniform the stress distribution in the valve casing the smaller is the risk of distortion arising between, for example, the valve seat 29 and the valve disc 30 in the valves of Fig. 3 or 4.

I claim:

1. In a valve, the combination comprising first and second complementary bowl-shaped members of fabricated metal plate, fastening means for detachably fastening said first and second bowl-shaped members to one another to form an entire valve casing, tubular inlet and outlet connection members in substantial axial alignment with one another and communicating with the inside of said valve casing, each of said bowl-shaped members having one of said connection members secured thereto and one end of at least the one of said connection members secured to said first bowl-shaped member protruding into said valve casing, a valve seat carried on said protruding connection member end, a valve closure member, means carried by said first bowl-shaped member for moving said valve closure member relatively to said valve seat to cover the valve seat to a variable extent, and thrust means for causing said valve closure member to thrust against said valve seat at least when said valve closure member is in the closed position, said thrust means comprising pairs of cooperating instrumentalities of which one of each pair is carried by said valve closure member and of which the other of each pair is rigidly fixed with respect to said first bowl-shaped member.

2. The combination according to claim 1 including a bar fixed in said first bowl-shaped member and extending across said protruding connection member end and at the side of said valve closure member remote therefrom, said other of each pair of cooperating thrust means instrumentalities being fixed to said bar.

3. The combination according to claim 1 including a bridge member secured to said protruding connection member end and extending across the opening thereof at the side of said valve closure member remote therefrom, said other of each pair of thrust means instrumentalities being attached to said bridge member.

4. In a valve, the combination comprising first and second bowl-shaped members of fabricated metal plate, said bowl-shaped members having substantially flat cooperating joint faces, fastening means for detachably fastening said two bowl-shaped members to one another with said joint faces in engagement with one another to form an entire valve casing, tubular inlet and outlet connection members disposed in substantial axial alignment with one another and substantially perpendicular to said joint faces and communicating with the inside of said valve casing, each of said bowl-shaped members having one of said connection members secured thereto and one end of at least the one of said connection members secured to said first bowl-shaped member protruding into said valve casing to a point short of said joint faces, a valve seat carried on said protruding connection member end and in a plane substantially parallel to said joint faces, a valve closure member, means carried by said first bowl-shaped member for sliding said valve closure member substantially parallel to said valve seat to cover said valve seat to a variable extent, and thrust means for causing said valve closure member to thrust against said valve seat at least when said valve closure member is in the closed position, said thrust means comprising pairs of cooperating instrumentalities of which one of each pair is carried by said valve closure member and of which the other of each pair is carried by said first bowl-shaped member.

5. In a valve, the combination comprising first and second complementary bowl-shaped members of fabricated metal plate having flat cooperating joint faces, fastening means for detachably securing said bowl-shaped members together with said joint faces in interengagement to form a valve casing, a tubular inlet connection member welded to one of said bowl-shaped members with its axis substantially perpendicular to said joint faces, a tubular outlet connection member welded to the other of said bowl-shaped members in substantially axial alignment with said inlet connection member, at least that connection member welded to said first bowl-shaped member having an end protruding into the valve casing to a point short of said joint faces, a valve seat carried on said protruding connection member end and having a valve seat surface lying within said first bowl-shaped member and substantially in a plane parallel to said joint faces, a valve closure member, a valve operating rod connected to said valve closure member and extending through said first bowl-shaped member in a direction substantially parallel to said joint faces for sliding said valve closure member on said valve seating surface to cover the valve seat to a variable extent, and thrust means for causing said valve closure member to thrust against said valve seat when said valve closure member is in the closed position, said thrust means comprising pairs of cooperating instrumentalities of which one of said pairs is carried by said valve closure member and of which the other of said pairs is carried by said first bowl-shaped member.

References Cited in the file of this patent

UNITED STATES PATENTS

| | | |
|---|---|---|
| 88,599 | Allen | Apr. 6, 1869 |
| 104,037 | King | June 7, 1870 |
| 127,951 | Beaumont | June 18, 1872 |
| 2,596,817 | McGovney | May 13, 1952 |
| 2,664,098 | McInerney | Dec. 29, 1953 |
| 2,832,564 | Williams | Apr. 29, 1958 |
| 2,834,571 | Hollander | May 13, 1958 |
| 2,868,495 | Lucas | Jan. 13, 1959 |

FOREIGN PATENTS

| | | |
|---|---|---|
| 153,044 | Great Britain | Oct. 25, 1920 |
| 599,767 | Germany | July 9, 1934 |
| 418,032 | Italy | Feb. 5, 1947 |
| 1,114,667 | France | Dec. 19, 1955 |